(12) United States Patent
Traeger et al.

(10) Patent No.: US 10,075,128 B2
(45) Date of Patent: Sep. 11, 2018

(54) SOLAR MODULE, METHOD FOR MANUFACTURING A SOLAR MODULE, AND METHOD FOR REPAIRING AND/OR RETROFITTING A SOLAR MODULE

(71) Applicant: Hanwha Q CELLS GmbH, Bitterfeld-Wolfen (DE)

(72) Inventors: Markus Traeger, Leipzig (DE); Robert Olyschlaeger, Leipzig (DE); Marc Dewenter, Halle (DE)

(73) Assignee: Hanwha Q CELLS GmbH, Bitterfeld-Wolfen (DE)

( * ) Notice: Subject to any disclaimer, the term of this patent is extended or adjusted under 35 U.S.C. 154(b) by 0 days.

(21) Appl. No.: 15/205,184

(22) Filed: Jul. 8, 2016

(65) Prior Publication Data

US 2017/0012577 A1 Jan. 12, 2017

(30) Foreign Application Priority Data

Jul. 8, 2015 (DE) .......................... 10 2015 212 789

(51) Int. Cl.
*H02S 40/34* (2014.01)
(52) U.S. Cl.
CPC .................................... *H02S 40/34* (2014.12)

(58) Field of Classification Search
CPC .... H01L 31/34; H01L 31/044; H01L 31/1876
See application file for complete search history.

(56) References Cited

U.S. PATENT DOCUMENTS

2005/0230140 A1 10/2005 Higashikozono et al.

FOREIGN PATENT DOCUMENTS

DE 10 2005 017 836 B4 8/2007

*Primary Examiner* — Tae-Sik Kang
(74) *Attorney, Agent, or Firm* — Vorys, Sater, Seymour and Pease LLP

(57) ABSTRACT

The invention relates to a solar module and a method for manufacturing a solar module, wherein the solar module comprises at least one solar cell; at least two connection elements (3) for establishing an electrical connection to the at least one solar cell; a bypass component (4) which is connected with the connection elements (3) and a connection box (2), in which the bypass component (4) is provided, wherein the connection box (2) comprises a potting material (6) which covers at least partially the bypass component (4). According to the invention the connection box (2) comprises at least one connection area (7, 7a, 7b) which is free of potting material (6), wherein a bypass component (40) and/or another electronic component is connectable with the connection elements (3) using the connection area (7, 7a, 7b). The invention also relates to a method for repairing and/or retrofitting a solar module.

8 Claims, 11 Drawing Sheets

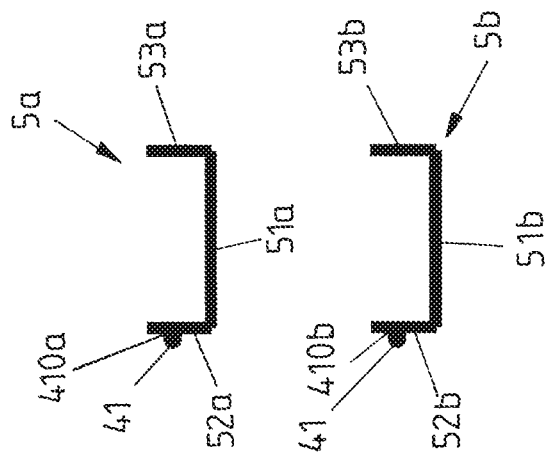
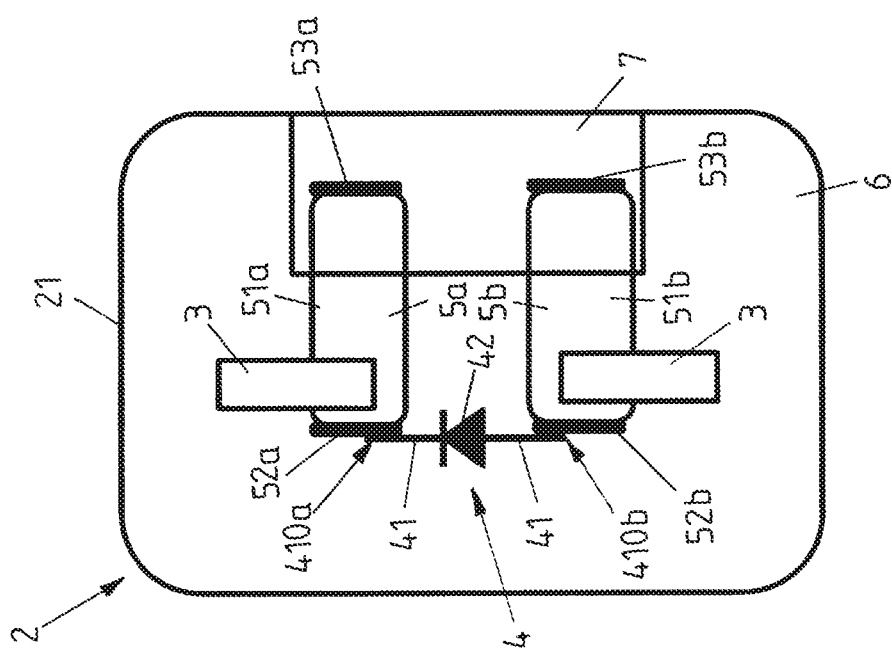

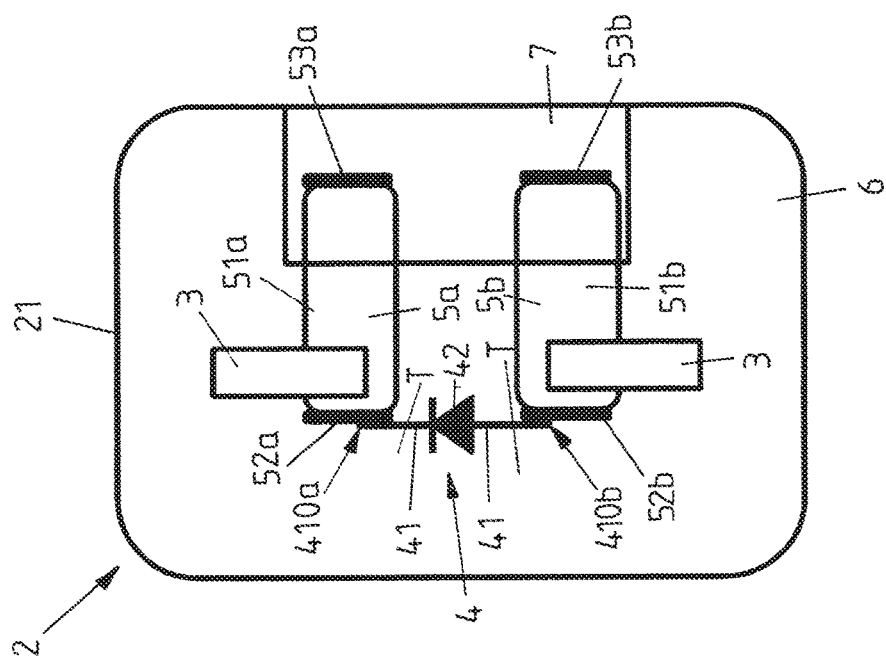

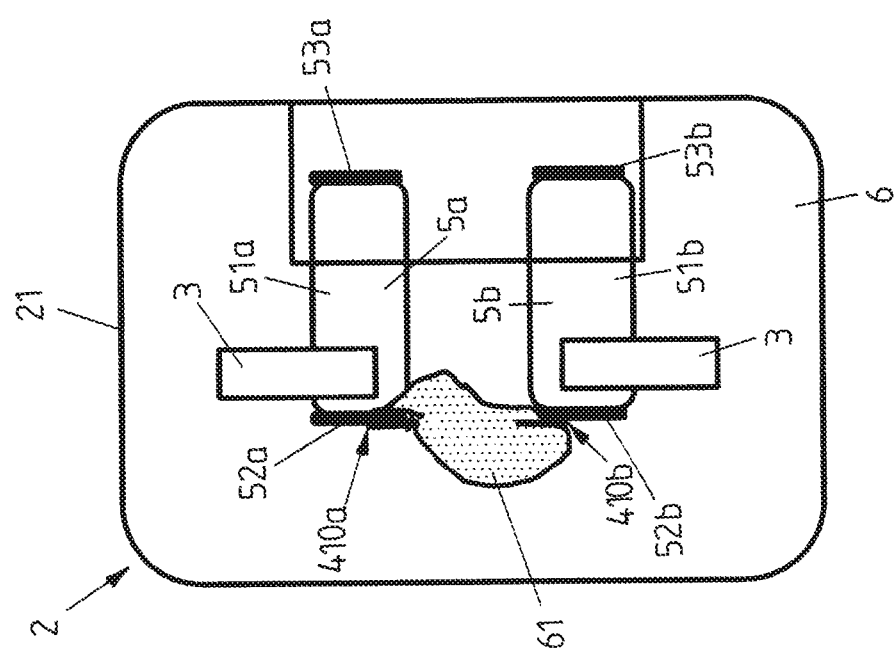

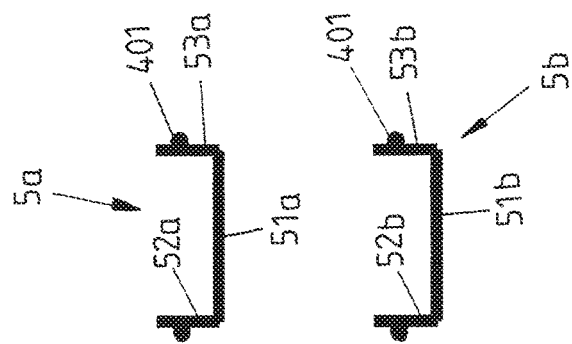
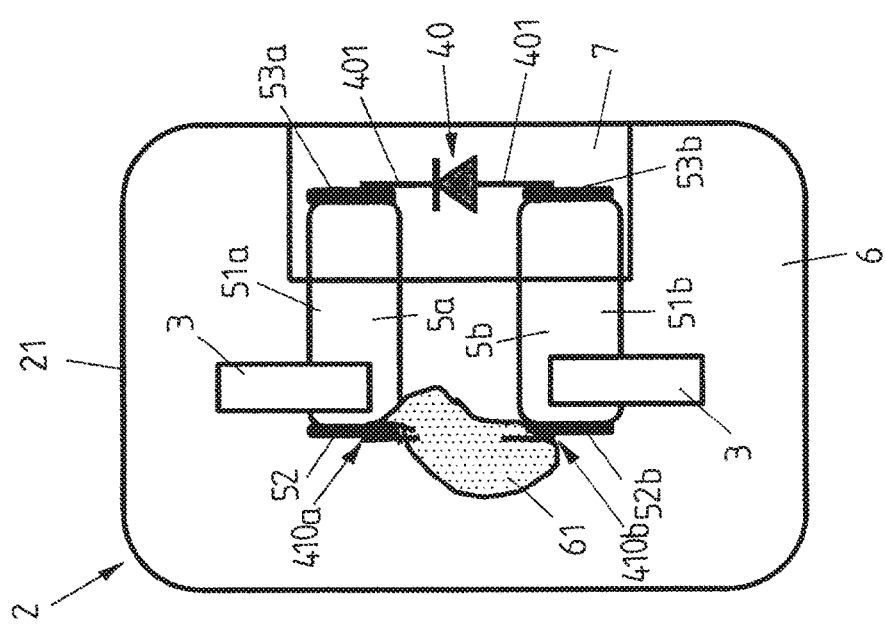

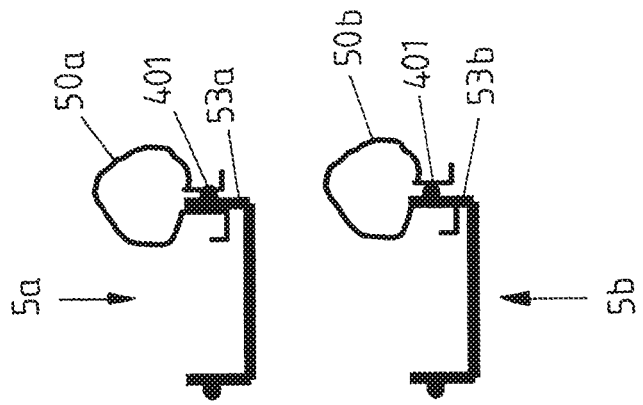
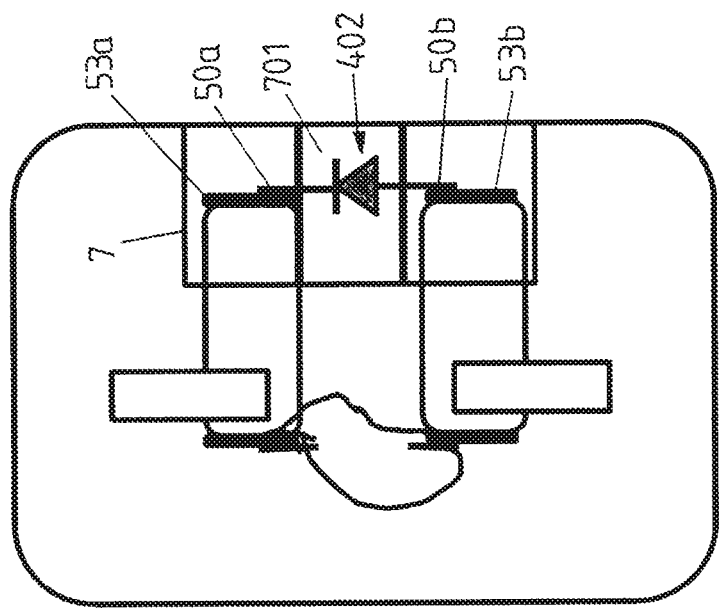

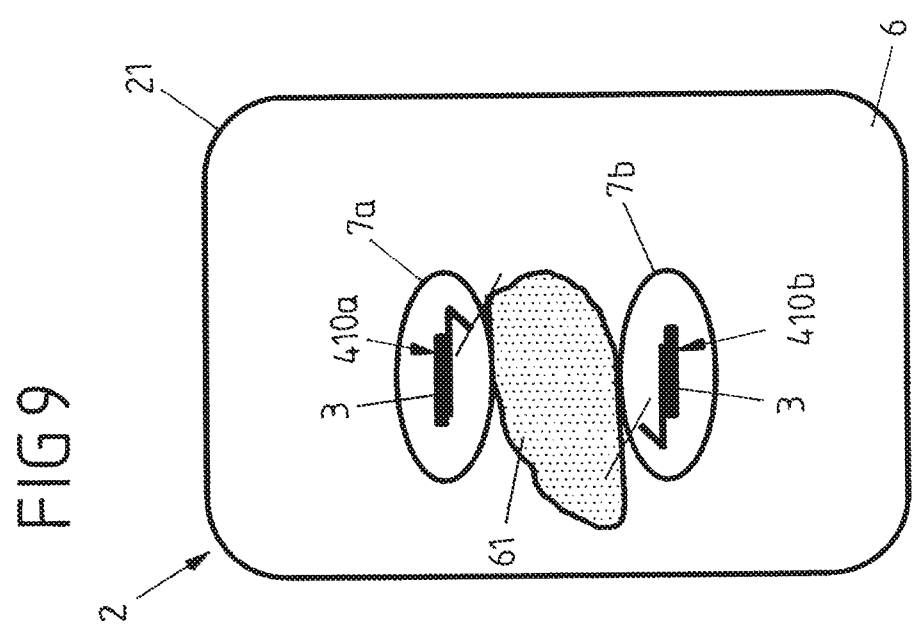

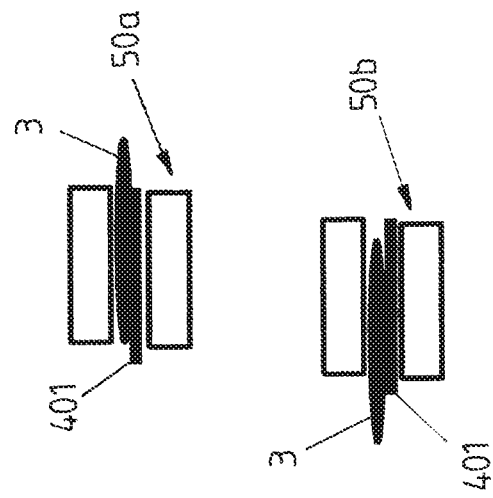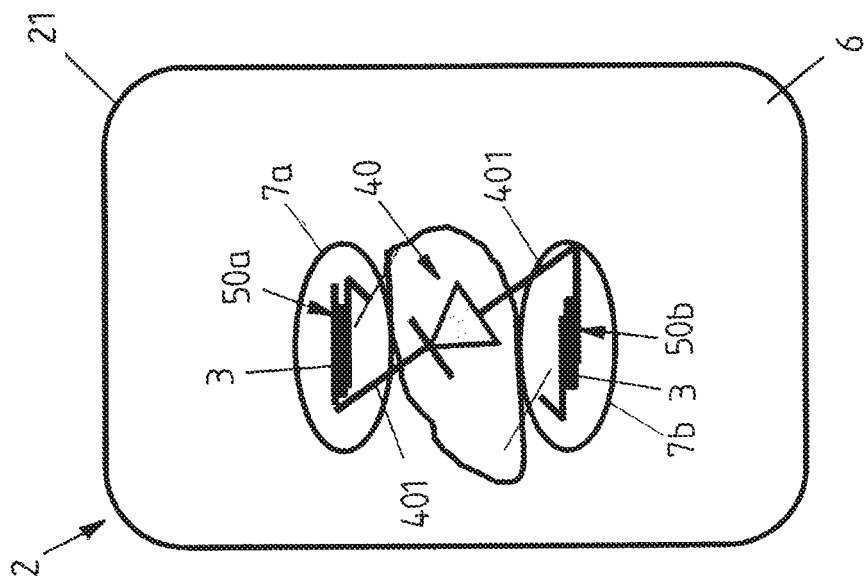

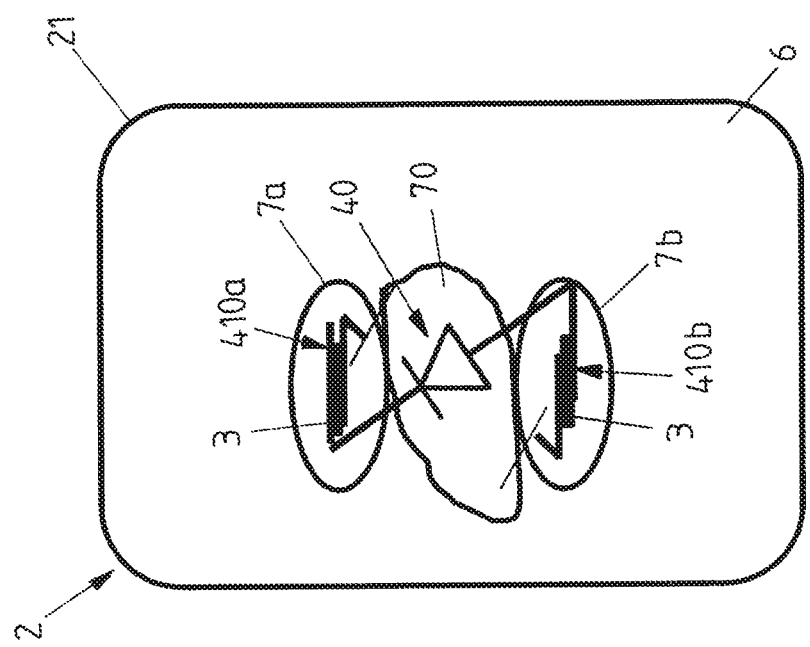

SOLAR MODULE, METHOD FOR MANUFACTURING A SOLAR MODULE, AND METHOD FOR REPAIRING AND/OR RETROFITTING A SOLAR MODULE

CROSS-REFERENCE TO RELATED APPLICATION AND CLAIM OF PRIORITY

This application claims priority under 35 U.S.C. 119(a) from Application No. DE 10 2015 212 789.3, filed in the Federal Republic of Germany on Jul. 8, 2015.

The invention relates to a solar module, a method for manufacturing a solar module as well as a method for repairing and/or for retrofitting (or upgrading or expanding) a solar module.

BACKGROUND

Solar cells of a solar module are connected via a connection box arranged on the rear side of the solar module (e.g. to a consumer) and/or with other solar cells or additional solar modules. Cross connectors from the solar cells of the solar module extend in the connection box, wherein the connection of the solar module is established by the cross connectors. Typically, a bypass diode is connected between two of such cross connectors, wherein the bypass diode is suitable for preventing a failure of the complete solar module or of all solar modules connected together in case of a partial shading of the solar module or the solar modules.

The connection box is frequently filled with potting material to protect in particular the bypass diode and/or electric contacts (e.g. from corrosion), to dissipate heat from the bypass diode and/or to prevent moisture input. The potting material, however, makes an exchange of the bypass diode in case of a defect difficult so that often the complete connection box or even the solar module has to be exchanged.

The underlying problem of the invention consists in simplifying the repair of solar modules.

SUMMARY

This problem is solved by the solar module and the method as disclosed herein. Further advantageous embodiments of the invention are given with the dependent claims.

For this, a solar module is provided with
at least one solar cell;
at least two connection elements for establishing an electric connection to the at least one solar cell;
at least one electronic bypass component connected with the connection elements;
at least one connection box, in which the bypass component is arranged (and which at least partially, e.g., covers the bypass component),
wherein the connection box includes a potting material, which at least partially covers the bypass component (in which the bypass component is, e.g., at least partially molded), wherein
the connection box comprises at least one connection area which is free of potting material, wherein via or in the connection area a supplementary bypass component and/or another electronic component is connectable with the connection elements.

The solar module comprises in particular a plurality of solar cells, which are electrically connected in the usual way with each other to form solar cell rows. For example, the connection elements (which are, in particular, formed in the same way as the abovementioned cross connectors) are for connecting one of such row of solar cells or for connecting the row of solar cells with another row of solar cells of the same or another module.

The bypass component shall prevent a complete failure (or break down) of the solar module in case of a partial shading or in case of a partial failure of the module, wherein the bypass component bridges shaded or defect cells of the module in the usual way. The bypass component is, for example, one of the already mentioned bypass diodes (for example a Schottky diode) or an electric circuit (in particular in the form of an integrated circuit). The electronic circuit comprises, for example, at least one transistor (e.g. a MOSFET).

The connection box comprises, in particular, a base with which the connection box is placed on a rear side (which is opposite to the side of the solar cells of the solar module) of the solar module and is fixed there. The connection elements are, in particular, lead in through an opening in the base of the connection box. In addition, the connection box can comprise an edge part (e.g. a frame) which is protruding from the base and limits the potting material inside the connection box and on which, in particular, a cover is placed. For example, silicone or epoxy resin is used as potting material. It is, however, also possible that the connection box does not comprise a separate base, but that the frame of the connection box is placed on the back sheet (rear side) of the solar module.

In case of a failure of the bypass component of the solar module, a supplemental bypass component (for example a supplementary bypass diode) can be inserted and connected in the connection area which is free of potting material and is directly or indirectly connected to the connection elements of the solar module. The connection area which is free of potting material enables as good a contact as possible between the supplementary bypass component and the connection elements because there is no risk that remains of the potting material (for example remains of silicone) interfere with the contact between the supplementary bypass components and the connection elements. Without the connection area which is free of potting material, the potting material would have to be removed completely from the area, in which the supplementary bypass component is connected with the connection elements, before the supplementary bypass component is connected with the connection elements. Remains of the potting materials, however, are difficult to remove, since a chemical removal would affect other components of the solar module, in particular, the remaining potting material or material of the connection box, and a mechanical removal is very difficult and in many cases not possible at the place of installation of the solar module.

Alternatively or additionally to the exchange of the bypass component, another (e.g. a newly developed) electronic component (for example, a power electric component) can be added to the solar module at the connection area which his free of potting material. Thereby, it is in particular possible to fit the solar module to new technical developments (i.e. to retrofit or to upgrade of the module).

It is further possible that the connection area which is free of potting material can be formed such that a removal of potting material before inserting the supplementary bypass component is not needed, which would simplify the repair of the connection box in case of a defect of the bypass diode.

It is further possible that the connection area which is free of potting material is located only in the predetermined area of contacts between the supplementary bypass component and the connection elements.

According to another embodiment of the invention, the solar module comprises at least two contact elements (e.g. in the form of contact rails or contact bars) which are each connected with one of the connection elements, wherein the connection area which is free of potting material extends over (or includes) a portion of at least one of the contact elements. Consequently, the supplementary bypass component can be connected with the portion of the contact elements in the connection area which is free of potting material. In particular, it is further possible that a portion of both contact elements is respectively free of potting material, i.e. the connection area which is free of potting material extends over a portion of each of the contact elements, or two separate connection areas are provided that are free of potting material, in each of which a portion of both contact elements is provided. It is further possible that the potting material completely fills the connection box up to the connection area and/or the connection areas.

For example, connecting areas, in which the original bypass component is each connected with a corresponding portion of the contact elements, are covered by the potting material, wherein the connection area which is free of potting material extends such that it is spaced from these connecting areas. Consequently, the potting material covers at least the bypass component and the connecting areas. It is understood that the bypass component comprises in particular an electronic device (which, e.g., forms the above-mentioned Schottky diode or the electronic circuit), which is connected with at least two (e.g. protruding connection contacts, for example in the form of contact wires, contact lines, contact pins and/or contact areas). With these contacts the bypass component is electrically connected, for example, to the above-mentioned contact elements of the solar module. For example, the bypass component comprises a MOSFET, which comprises two contact pins and a contact area as connection contacts.

It is further possible that the connection area which is free of potting material includes connecting areas in which the original bypass component is connected with a portion of (each of) the contact elements, i.e. the connecting areas remain free of potting material. In this case the supplementary bypass component is arranged in a similar area of the connection box as the original bypass component.

According to a further embodiment of the present invention at least one of the contact elements comprises two contact portions which are spaced from each other and protrude at an angle (in particular being approximately perpendicular) from a base or main body of the contact elements, wherein the bypass component is connected with one of the contact portions, and at least one of the contact portions is provided at least partially in the connection area which is free of potting material. For example, the bypass component is connected with respective contact portions of the contact elements which are covered by potting material, while the respective other contact portions of the contact elements are in the connection area which is free of potting material and enable connecting the supplementary bypass component. In particular, the contact elements are provided as contact rails, e.g. with a U- or V-shaped cross-section (when viewed parallel to the main extension direction of the contact rail). The invention, of course, is not limited to this particular form of the contact elements. Rather, arbitrarily formed contact structures are possible as contact elements, for example also mainly planar extending elements. For example, it is further possible that the bypass component is connected with a portion of the main body of the contact element and that the supplementary bypass component is also connected with the main body of the contact element.

The presence of contact elements by which the contact of the solar module is made to the connection elements is, however, not mandatory. Rather, it is also possible that the bypass component (i.e. in particular its connection contacts, see above) is directly connected via connection means with the connection elements of the solar module, for example via a firmly-bonded or frictionally-connected and/or an interlocking connection (for example in the form of a solder connection, clamp connection, crimp connection or a welded connection).

In this case it is further possible that the connection area which is free of potting material can extend at least over a portion of at least one of the connection elements. In case of a defect of the bypass component the supplementary bypass component can be connected via the connection area which is free of potting material directly with the connection elements. It is here especially possible that at least two connection areas which are free of potting material are provided, which respectively extend over a portion of one of the connection elements.

According to a further embodiment of the invention the connection area is separated by at least one separation element from the potting material, wherein the separation element is sufficiently sealed in order to prevent that potting material can enter the connection area. For example, the separation element enables also that the connection box can at least approximately be completely filled with potting material except for the connection area (or the connection areas); in particular over the whole height of the connection box, i.e. from its bottom up to the cover. It is also possible that the separation element includes at least one predetermined breaking point to provide especially a recess over which the supplementary bypass component (in particular the connection wires) can be inserted in the connection area which is free of potting material. It is also possible that the separation element comprises a lower thickness so that the separation element can be penetrated in the process of inserting the supplementary bypass component.

The separation element is provided, e.g. in the form of a film, a band or of another plastic element (or also of paper). A permanently provided separation element is, however, not mandatory. Rather, it is also possible that a separation element is used for creating the connection area which is free of potting material during the filling of the connection box with potting material, which is, however, removed after healing of the potting material.

According to another embodiment of the invention, the connection area which is free of potting material may be filled with fill material which is different from the potting material, wherein the fill material may not exhibit adhesion or only a minor adhesion with the connection element of the solar module. For this, the fill material may have a good thermal conductivity. It is further especially electrically insulating so that no electric short can occur between the connection elements. The fill material is removed prior to the exchange of the bypass component and/or the adding of the other electronic component.

The invention relates also to a method of manufacturing a solar module, in particular such as it is described above, with the following steps:

Providing at least one solar cell as well as at least two connection elements for establishing an electric connection to the at least one solar cell;

Arranging at least one connection box;

Arranging at least one bypass component in the connection box and connecting the bypass component with the connection elements;

Filling the connection box with a potting material so that the bypass component is covered at least partially by the potting material, wherein the connection box is filled with potting material such that at least one connection area is provided, which is free of potting material, wherein by the connection area a supplementary bypass component and/or another electronic component can be connected with the connection elements.

It is in particular possible that prior to the filling of the connection box with potting material as it is described above, the desired connection area can be defined by at least one separation element. The separation element can be removed, as it is described above, after the healing of the potting material.

The present invention relates further to a method of repairing and/or of retrofitting a solar module as it is described above, wherein a supplementary bypass component and/or another electronic component is connected using the connection area which is free of potting material with the connection elements of the solar module.

For example, the supplementary bypass component is connected with the connection elements via a clamp connection. This clamp connection directly with the connection elements is, however, not mandatory. As it described above, it is also possible that contact elements can be provided, which are connected to the connection elements, wherein the clamp connection is provided to these contact elements. Of course, the electric connection of the supplementary bypass component with the connection elements can also be established in another way, as it is described above (e.g. using a solder connection).

It is further possible, after inserting and connecting the supplementary bypass component with the connection elements, that the supplementary bypass component can be covered by the potting material to protect as to the original bypass component also the supplementary bypass component.

It is also possible that prior to and after the insertion of the supplementary bypass component the defect bypass component is removed. This is, however, not necessarily needed. Rather, it is also possible that the defect bypass component can remain in the connection box. This is in particular possible if the defect bypass component comprises a high electric resistance for both current directions.

BRIEF DESCRIPTION OF THE FIGURES

In the following the invention will be described in conjunction with embodiments with reference to the Figures, in which:

FIG. 1A shows schematically a cross-sectional view of the area of the connection box of a solar module according to a first embodiment of the invention;

FIG. 1B shows the contact rails of the solar module of FIG. 1A in a cross-sectional view;

FIGS. 2-5 show method steps for replacing the bypass component of the solar module of FIG. 1A;

FIG. 6A shows a variation of FIG. 5;

FIG. 6B shows the area of the contact rails of the solar module of FIG. 6A;

FIGS. 8-11 show method steps for the replacement of the bypass component of the solar module of FIG. 7 by a supplementary bypass component.

DETAILED DESCRIPTION

Figure 5:
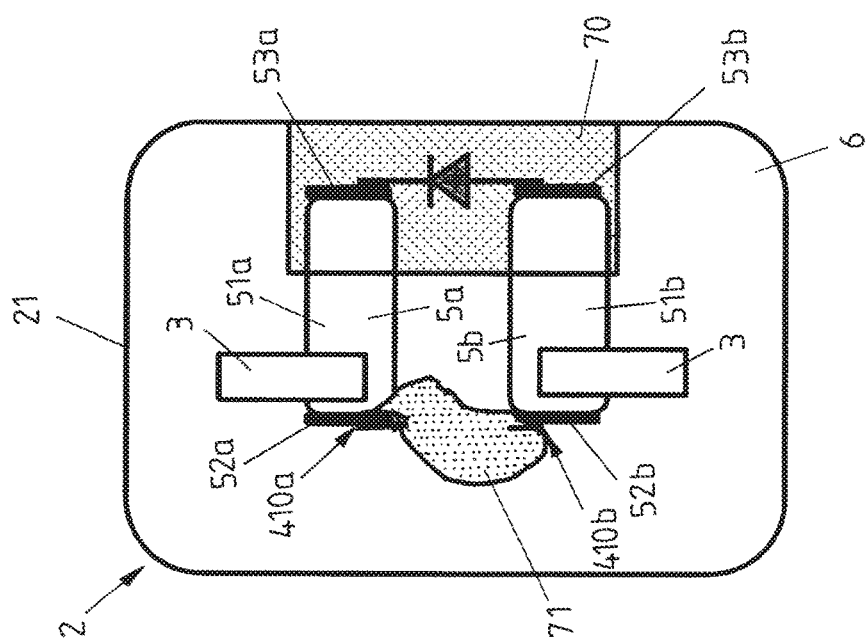

FIG. 1A shows in a top view a part of the rear side (or back sheet) of a solar module according to the invention, wherein in particular a connection box 2 of the solar module is depicted which is mounted on the rear side of the solar module. The connection box 2 is arranged in an area of two connection elements in form of cross connectors 3, wherein each of them extends from a row of solar cells arranged on the front side of the solar module to the rear side and into the connection box 2, for example through recesses in the base of the connection box 2. A bypass component in form of the bypass diode 4 is further arranged in the connection box 2, the diode structure 42 of which is connected via connection wires 41 with both cross connectors 3. The connection box 2 comprises further especially a cover as depicted in FIG. 1A that is placed on a circumferential edge 21.

The connection of the bypass diode 4 to the cross connectors 3 is made by a firmly bonded connection (e.g. by a solder connection) each to one contact element in the form of a contact rail 5a, 5b that in turn are electrically connected with the cross connectors 3; for example, also via a firmly bonded connection (in particular also in the form of a solder connection).

The connection box 2 comprises further a potting material 6 which covers the bypass diode 4 and the cross connector 3. In particular, the bypass diode 4 is molded in the potting material 6, wherein the potting material 6 covers also connecting areas 410a, 410b, where the diode 4 is connected with the contact rails 5a, 5b. The connection box 2 comprises, however, also a connection area 7, which includes no potting material, wherein the connection area 7 is spaced from the connecting areas 410a, 410b. The contact rails 5a, 5b each extend with one end into the connection area 7 which is free of the potting material.

According to FIG. 1B which depicts a cross-sectional view of the contact rails 5a, 5b along the longitudinal extension direction (from the left side to the right side in FIG. 1A), the contact rails 5a, 5b comprise a U-shaped cross-section, wherein two side contact portions 52a, 52b, 53a, 53b extend each away from a main body 51a, 51b. The connection of the bypass diode 4 or with the contact rails 5a, 5b is made through the contact portions 52a, 52b (on the left-hand side in FIG. 1B), wherein in FIG. 1B the connection wires 41 of the bypass diode 4 are indicated. The contact portions 52a, 52b are molded in the potting material 6. The other contact portions 53a, 53b of the contact rails 5a, 5b are, however, arranged in the contact area 7 which is free of potting material.

In case a defect of the bypass diode 4 is determined or the bypass diode 4 has to be exchanged for other reasons, the bypass diode 4 is removed, wherein at first the connection wires 41 of the bypass diode 4 are cut (cf. FIG. 2, wherein the cutting of the connection wires 41 is indicated by the line T). In the following, the diode 4 is taken out, wherein also a portion 61 of the potting material 6 will be removed; cf. FIG. 3.

After removal of the diode 4 a supplementary bypass component will be arranged in the form of a supplementary diode 40 in the connection area 7 which is free of potting material, wherein the connection wires 401 of the supplementary diode 40 are connected with the connection portions 53a, 53b of the contact rails 5a, 5b, whereby a contact between the supplementary diode and the cross connectors 3 will be established. This is indicated in FIGS. 4A and 4B. The connection of the diode connection wires 401 is, in particular, made by a solder connection as the connection of the original bypass diode 4. After the connection of the supplementary diode 40 with the contact rails 5a, 5b, the connection area 7 will be molded with potting material 70 (FIG. 5). It is further possible that the area 61, in which the defect bypass diode 4 was taken out, is filled again with potting material 71.

It is, however, not necessary that the supplementary diode 40 will be connected to the contact rails 5a, 5b by a solder connection. Rather, it is also possible that a welding connecting, a crimp connection or a clamp connection are used, for example using so-called Omega clamps 50a, 50b as indicated in FIGS. 6A, 6B. After that, the connection wires 401 of the supplementary diode 40 are each mounted on the portion 53a, 53b of the contact rails 5a, 5b by a respective Omega clamp 50a, 50b and will be clamping supportive there. The mounted supplementary diode 40 (especially their diode structure 402) will then be partially protected with potting material 701, wherein no potting material 701 is provided at the portions of the connection between the connection wires 401 of the supplementary diode 40 and the contact portions 53a, 53b of the contact rails 5a, 5b (i.e. the portions of the Omega clamps 50a, 50b). However, it is also possible that the complete connection area 7 (as in FIG. 5) will be filled with potting material after the insertion of the supplementary diode 40.

For filling the potting materials 71, 701 after the insertion of the supplementary diode, the connection box 2 may comprise a cover with a part over which the potting material 71, 701 can be filled in without a need of removing the cover. This, in particular, enables an overhead filling of the connection box 2.

It is further possible that in addition or alternatively to the connection areas 7 which are free of potting material, there are connection areas which are free of potting material that each include one of the connecting areas 410a, 410b, in which the original diode 4 is connected to the contact rails 5a, 5b. The diode structure 42 of the diode 4 is, however, covered by potting material. The supplementary diode 40 could be inserted in a similar position as the original diode 4 and could be connected with the contact rails 5a, 5b.

Figure 7:
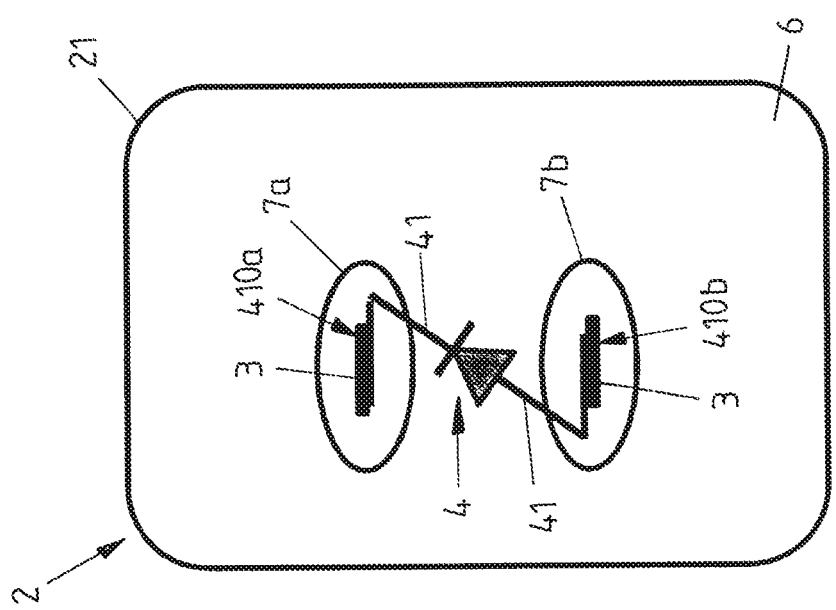
FIG. 7 shows schematically a cross-sectional view through the area of the connection box of a solar module according to a second embodiment of the invention.

According to another embodiment of the invention, the contact rails 5a, 5b are not present, wherein the contact wires 41 of the bypass diode 4 are connected by connection means directly with the cross connectors 3 (e.g. using a solder connection, wherein the solder material represents the connection means), as it is depicted in FIG. 7.

Figure 8:
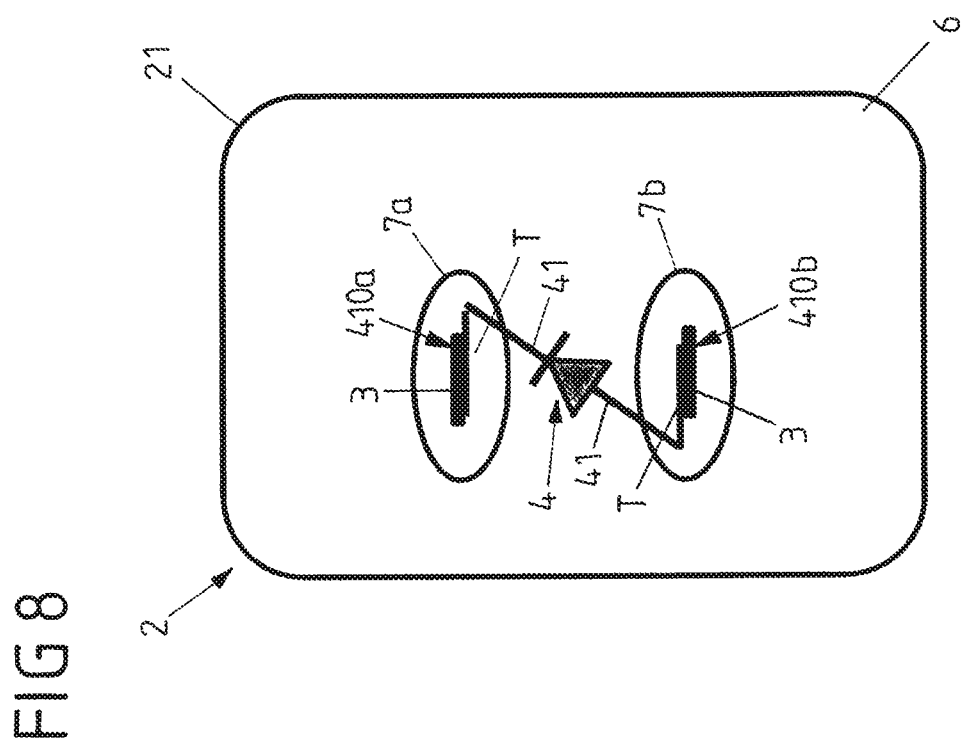

In this embodiment, the bypass diode 4 is again molded in the potting material 6. However, the connection box 2 includes in the respective connecting areas 410a, 410b, in which the connection of the connection wires 41 of the diode 4 with the cross connectors 3 is established, a connection area 7a, 7b, in which no potting material is present. In order to remove the bypass diode 4, the connection wires 41 are cut off in analogy to FIG. 2 (see FIG. 8), and the bypass diode 4 and a part 61 of the potting material 6 in the area of the diode 4 are removed (FIG. 9).

Subsequently, a supplementary diode 40 is also connected directly by its connection wires 401 with the cross connectors 3 using the connection means (e.g. soldered). Instead of a solder connection, the supplementary diode 40 can also be connected with the cross connectors 3 by other means, for example using the above-described Omega clamps 50a, 50b; cf. FIG. 10B. After insertion and connection of the supplementary diode 40, the supplementary diode 40 is molded in the potting material 70 (FIG. 11).

It is understood that the depicted (approximately mirror-symmetric) orientation of the supplementary diode 40 relative to the orientation of the original diode 4 represents of course only one possibility. It is, for example, further possible that the supplementary diode 40 is arranged approximately with the same orientation as the original diode 4.

It is further possible that the connection areas 7 or 7a, 7b which are free of potting material are cut off from the potting material 6 by at least one separation element. For example, the contact rails 5a, 5b extend through the separation element (FIGS. 1 to 6) or the connection wires 401 of the supplementary diode 40 are led through the separation element (FIGS. 7 to 11). It is further possible that the separation wall comprises not only a side portion that limits the connection areas 7 or 7a, 7b from the side, but comprises additionally a cover portion that extends in parallel to the base of the connection box, wherein the cover portion covers, for example, first of all the potting material and is removed only prior to the insertion of the supplementary diode.

It is further possible that, as it is described above, the separation elements is used during the filling of the connection box 2 with potting material, the separation elements are, however, removed after the healing of the potting material.

The invention claimed is:

1. A solar module, comprising:
   at least one solar cell;
   at least two connection elements for establishing an electric connection to the at least one solar cell;
   at least one bypass component that is connected with the at least two connection elements;
   at least one connection box, in which the at least one bypass component is arranged;
   wherein the at least one connection box comprises potting material, that covers the at least one bypass component at least partially,
   and at least one connection area that is free of the potting material, wherein using the at least one connection area results in at least one of: a supplementary bypass component and another electronic component being connectable with the at least two connection elements; and
   at least two contact elements each extending between two spaced contact portions, one of said two spaced contact portions being connected with the at least one bypass component and one of the at least two connection elements, and the other of said two spaced contact portions being arranged in the at least one connection area which is free of the potting material.

2. The solar module of claim 1, characterized in that connecting areas in which the at least one bypass component is connected with one of the at least two contact elements, are covered by the potting material, wherein the at least one connection area which is free of the potting material extends spaced from the connecting areas.

3. The solar module of claim 1, characterized in that the at least one connection area which is free of the potting material includes connecting areas, in which the corresponding bypass component is connected with each one of the contact elements.

4. The solar module of claim 1, characterized in that at least one of the at least two contact elements comprises contact portions which are spaced from each other and protrude at an angle from a main body, wherein the at least one bypass component is connected with at least one of the following: one of the contact portions and a portion of the main body, and at least one of the following: at least one of the contact portions and the portion of the main body is arranged at least partially in the at least one connection area which is free of the potting material.

5. The solar module of claim 4, wherein: at least one of the contact portions that is not directly connected with the at least one bypass component or the portion of the main body that is not directly connected with the at least one bypass component is arranged in the at least one connection area which is free of the potting material.

6. The solar module of claim 1, characterized in that the at least one connection area which is free of the potting material extends at least over a portion of at least one of the at least two connection elements.

7. The solar module of claim 1, characterized in that at least one connection wire of the at least one bypass component is connected with one of the at least two connection elements in a connecting area, wherein at least one of the at least one connection area is provided which is free of the potting material that includes the connecting area.

8. The solar module of claim 1, characterized in that the at least one connection area which is free of the potting material is separated from the potting material by at least one separation element.

* * * * *